United States Patent [19]

Okada et al.

[11] 3,941,177
[45] Mar. 2, 1976

[54] PNEUMATIC TIRES

[75] Inventors: Ryozo Okada; Munenori Iuchi; Munemitsu Yamada, all of Toyota, Japan

[73] Assignee: Dunlop Limited, London, England

[22] Filed: May 2, 1974

[21] Appl. No.: 466,465

[52] U.S. Cl. .................. 152/362 R; 152/362 CS
[51] Int. Cl.² ................................. B60C 15/04
[58] Field of Search.... 152/362 R, 362 AB, 362 CS, 152/354, 355, 356

[56] References Cited
UNITED STATES PATENTS

| | | | |
|---|---|---|---|
| 2,713,382 | 7/1955 | Bosomworth et al. | 152/362 CS |
| 2,822,018 | 2/1958 | Perdriau | 152/362 CS |
| 3,302,681 | 2/1967 | Travers | 152/362 R |
| 3,631,913 | 1/1972 | Boileao | 152/362 R |
| 3,777,799 | 12/1973 | Montagne | 152/362 R |

*Primary Examiner*—Drayton E. Hoffman
*Assistant Examiner*—Larry H. Martin
*Attorney, Agent, or Firm*—Stevens, Davis, Miller & Mosher

[57] ABSTRACT

A pneumatic tire is provided with at least one radially disposed ply of steel cord fabric turned-up around each bead core to terminate axially outwardly thereof and has a chafer strip disposed adjacent to and axially outwardly of each turn-up. The chafer strip comprises a folded strip of steel cord fabric which fabric is less rigid than the fabric of the carcass ply. The folded portion of the chafer strip is disposed radially outwardly of the ends thereof and is positioned to cover the edge of the turned-up end the carcass ply.

5 Claims, 3 Drawing Figures

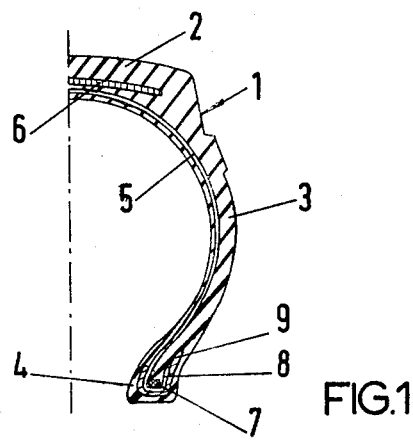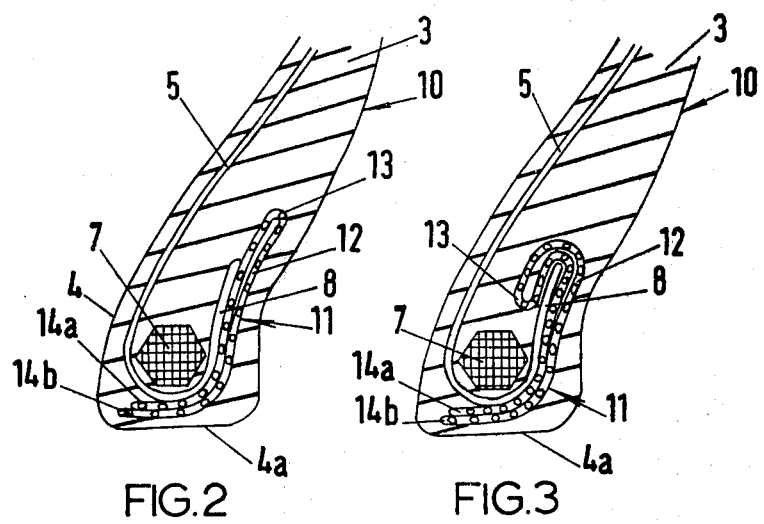

PNEUMATIC TIRES

According to the present invention, a pneumatic tire comprises at least one carcass ply of steel cord fabric, the cords of the ply being disposed substantially radially of the tire, two bead regions each having a bead core around which is turned an end of the carcass ply to terminate axially outwardly thereof, and a chafer strip disposed in each bead region adjacent to and axially outwardly of the ply turn-up end, the chafer strip comprising a folded strip of steel cord fabric which fabric being less rigid than the carcass ply fabric, the folded portion of the chafer strip being disposed radially outwardly of the two ends thereof and being positioned to cover the edge of the turned-up end of the carcass ply.

In one embodiment of the invention, the folded portion of the chafer strip preferably extends radially outwardly of the end of the turn-up to effectively extend the ply end and thereby preventing the cut-edge of the fabric of the turn-up from being the radially outermost extremity of the turn-up. In an alternative construction, the folded portion of the chafer strip is folded to be substantially parallel to an adjacent portion thereof and to cover the edge of the turned-up end of the ply by enclosing it in the second fold therein thereby again eliminating the cut edge from the radially outermost extremity of the turn-up.

The invention will now be described with reference to the accompanying drawings of which:

FIG. 1 shows a cross-section of half a conventional tire of general construction;

FIG. 2 shows a cross-section of a bead region of a tire in accordance with a first embodiment of the invention; and FIG. 3 shows a cross-section of a bead region of a tire in accordance with a second embodiment of the invention.

Referring to FIG. 1, the tire 1 has a tread 2, sidewalls 3 (only one shown) and bead regions 4 (only one shown). The tire 1 is reinforced with at least one carcass ply 5 of radially disposed steel cord fabric, and a breaker layer 6 disposed in the crown region. Each bead region 4 is provided with a bead core 7 around which and axially outwardly of is turned the end 8 of the carcass ply 5. Disposed adjacent to and axially outwardly of each of the ends 8 of the carcass ply 5 is a chafer strip 9 of steel cord fabric which provides reinforcement from the bead region 4 to the area which bounds the bead region 4 and the sidewall 3.

In pneumatic tires having this type of construction, repetitive stresses are set up in the sidewall area 3 on rotation of the tire during use, thus loading the rubber of the sidewall area 3, the carcass ply 5 and the chafer strip 9. These loads are transmitted through the bead core 7 to the wheel on which the tire is mounted. There is a large difference in rigidity between the steel cord fabric of the carcass ply and chafer strip 9 and the surrounding rubber and consequently these repetitive stresses are concentrated by the very rigid steel cord fabric. Additionally, the adhesion between the rubber and the edges of the steel cord fabric is less than in other areas resulting in a tendency to cracking and peeling at the boundary between the rubber and the cut edges of the fabric. Extension of this damage finally results in breakdown of the tire.

Referring to FIG. 2, in a tire 10 in accordance with a first embodiment of the invention, the general construction thereof is the same as shown in FIG. 1, like reference numerals indicating like parts. However, the tire 10 is provided with a chafer strip 11 comprising a folded strip 12 of steel cord fabric less rigid than the fabric of the carcass ply 5. The folded portion 13 of the strip 12 is disposed radially outwardly of the two ends 14a and 14b of the strip 12. The chafer strip 11 covers the edge of the turned-up end 8 of the carcass ply by extending radially outwardly of the end 8. The ends 14a and 14b of the folded strip 12 are both located in the lower bead region 4a.

In the second embodiment (see FIG. 3) the folded portion 13 of the strip 12 is folded to be substantially parallel to an adjacent portion of the strip and to cover the edge of the turned-up end 8 by enclosing it in the second fold therein.

The cords of the chafer strip 11 are disposed to make an angle in the range 15° to 30° to the circumferential tangent to the bead core 7.

In the tire in accordance with the invention the turned-up end 8 of the carcass ply 5 is protected by the chafer strip 11 which is made of less rigid steel cord fabric than that of the ply 5 and is also folded, and so the load, which is transmitted from the sidewall area 3 to the bead region 4, is tended to be spread by the chafer which results in a tendency for the stress concentration in the edges of the steel cord of the carcass ply 5 or chafer strip 11 to be reduced. Additionally, the constructions described herein also eliminate cut edges of fabric from being the radially outermost extremity of the turn-up portion thereby not only removing the cut edge(s) to a region where they are subject to less stress but also ensuring maximum adhesion at the extremity where stress is at a maximum due to the region of discontinuity between the fabric and the sidewall rubber. Accordingly, the damage due to cracking and peeling that frequently occurs near the extremities of the ply 5 and chafer strip 11 tends to be reduced or obviated.

Additionally, the chafer strip 11 is a doubled strip 12 and so movement in the bead area is reduced and running stability increased.

The distribution of the stresses which load the chafer strip 11 and the ply end 8 can be further enhanced by disposing adjacent to and axially outwardly of the strip 11, further reinforcing layers of fabric made from synthetic fibre such as nylon or polyester.

We claim:

1. A pneumatic tire comprising at least one carcass ply of steel cord fabric, the cords of the ply being disposed substantially radially of the tire, two bead regions each having a bead core around which is turned an end of the carcass ply to terminate axially outwardly thereof, and a chafer strip disposed in each bead region adjacent to and axially outwardly of the ply turned up edge, the chafer strip comprising a strip of steel cord fabric less rigid than the fabric of the carcass ply, and said strip being of a doubled construction having a folded portion lying substantially midway between edge portions of the strip, the folded portion of the chafer strip being disposed radially outward of the two edges of the strip and being positioned to extend substantially alongside the turned-up edge of the carcass ply and provide support to said turned up edge during flexing of the tire in use.

2. A tire according to claim 1 wherein the folded portion of the chafer strip is disposed radially outwardly of the edge of the turned-up end of the carcass ply.

3. A tire according to claim 1 wherein the chafer strip is formed with a second fold, the edge of the turned-up end of the carcass ply being covered by being enclosed in the second fold in the strip.

4. A tire according to claim 1 wherein the cords of the chafer strip are disposed to make an angle in the range 15° – 30° to the circumferential tangent to the bead core.

5. A tire according to claim 1 wherein a reinforcing layer of fabric made from synthetic fibres is disposed adjacent to and axially outwardly of the chafer strip.

* * * * *